(No Model.) 5 Sheets—Sheet 1.

C. W. BROWN.
CYCLE FRAME.

No. 538,232. Patented Apr. 30, 1895.

Witnesses
J. G. Hinkel
I. A. Fairgrieve

Inventor
Charles William Brown
by Foster Freeman
Attys (No Model.) C. W. BROWN. 5 Sheets—Sheet 2.
CYCLE FRAME.
No. 538,232. Patented Apr. 30, 1895.
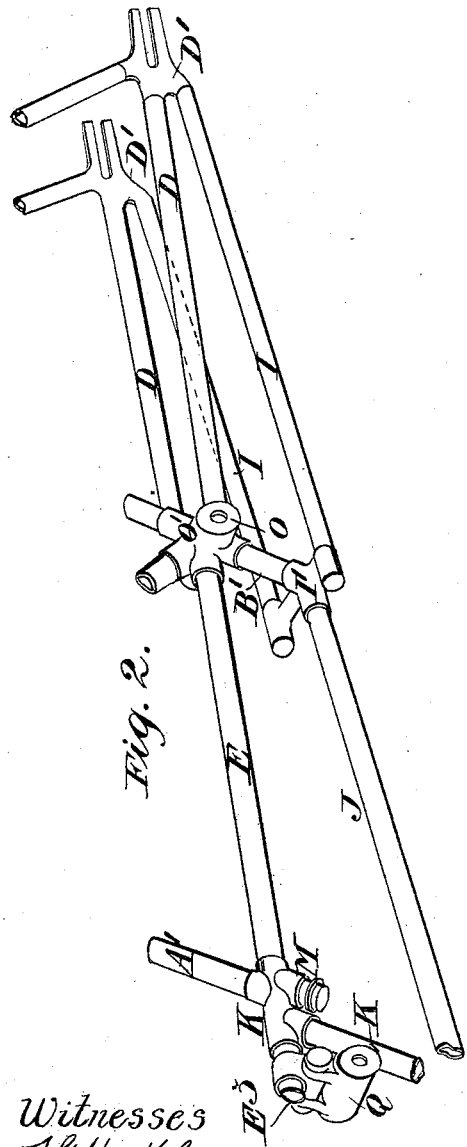
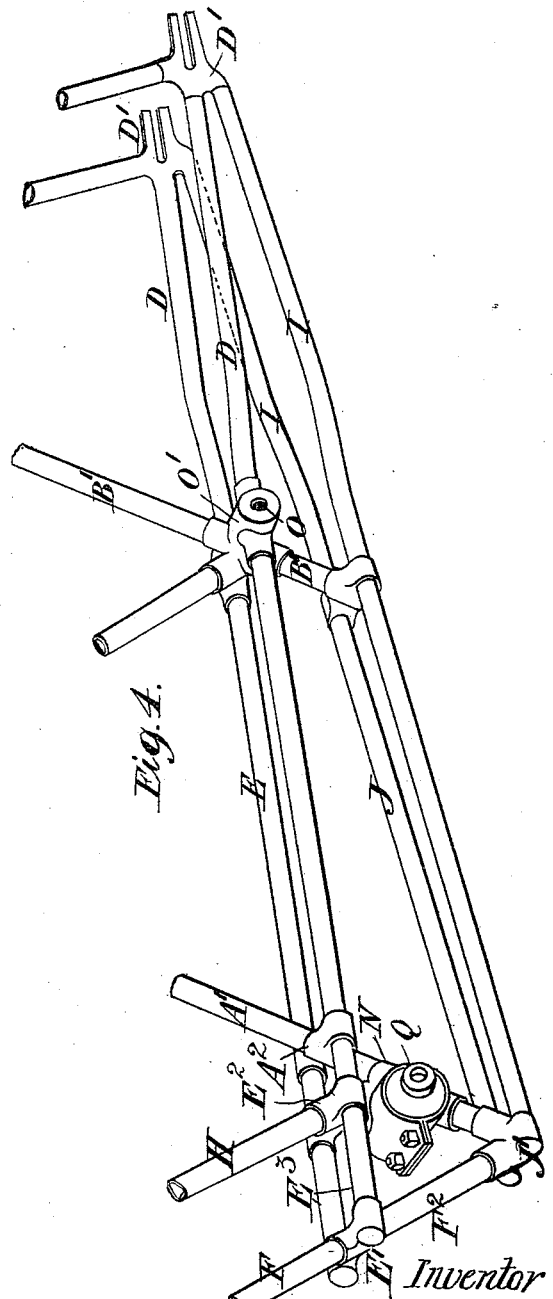

(No Model.)  5 Sheets—Sheet 3.

C. W. BROWN.
CYCLE FRAME.

No. 538,232. Patented Apr. 30, 1895.

Witnesses
J. G. Hinkel
I. A. Fairgrieve

Inventor
Charles William Brown
by Joshua Freeman
attys.

THE NORRIS PETERS CO., PHOTO-LITHO., WASHINGTON, D. C.

(No Model.)  C. W. BROWN.  5 Sheets—Sheet 4.
CYCLE FRAME.

No. 538,232.  Patented Apr. 30, 1895.

Witnesses
J. G. Hinkel
J. A. Fairgrieve

Inventor
Charles William Brown
by Foster Freeman
Attys.

(No Model.) 5 Sheets—Sheet 5.

C. W. BROWN.
CYCLE FRAME.

No. 538,232. Patented Apr. 30, 1895.

Witnesses
J. G. Hinkel
I. A. Fairgrieve

Inventor
Charles William Brown
by Jasper Freeman
Attys

UNITED STATES PATENT OFFICE.

CHARLES WILLIAM BROWN, OF LONDON, ENGLAND, ASSIGNOR TO HUMBER & CO., LIMITED, OF SAME PLACE.

CYCLE-FRAME.

SPECIFICATION forming part of Letters Patent No. 538,232, dated April 30, 1895.

Application filed September 26, 1894. Serial No. 524,089. (No model.)

*To all whom it may concern:*

Be it known that I, CHARLES WILLIAM BROWN, a subject of the Queen of England, residing at North Finchley, London, Middlesex, England, have invented certain new and useful Improvements in Cycle-Frames, of which the following is a specification.

This invention relates to cycle frames particularly those which are commonly known as open-fronted adapted to the use of ladies whose skirts render frames of the common diamond type with horizontal cross bars near the top unsuitable.

The improved frame may be used with tandem or single bicycles and with tricycles but I will describe it as applied to a single "safety" bicycle and a safety tandem.

The object of the invention is to increase the rigidity of the frame.

The invention will be best understood by reference to the accompanying drawings, in which—

Figure 1:
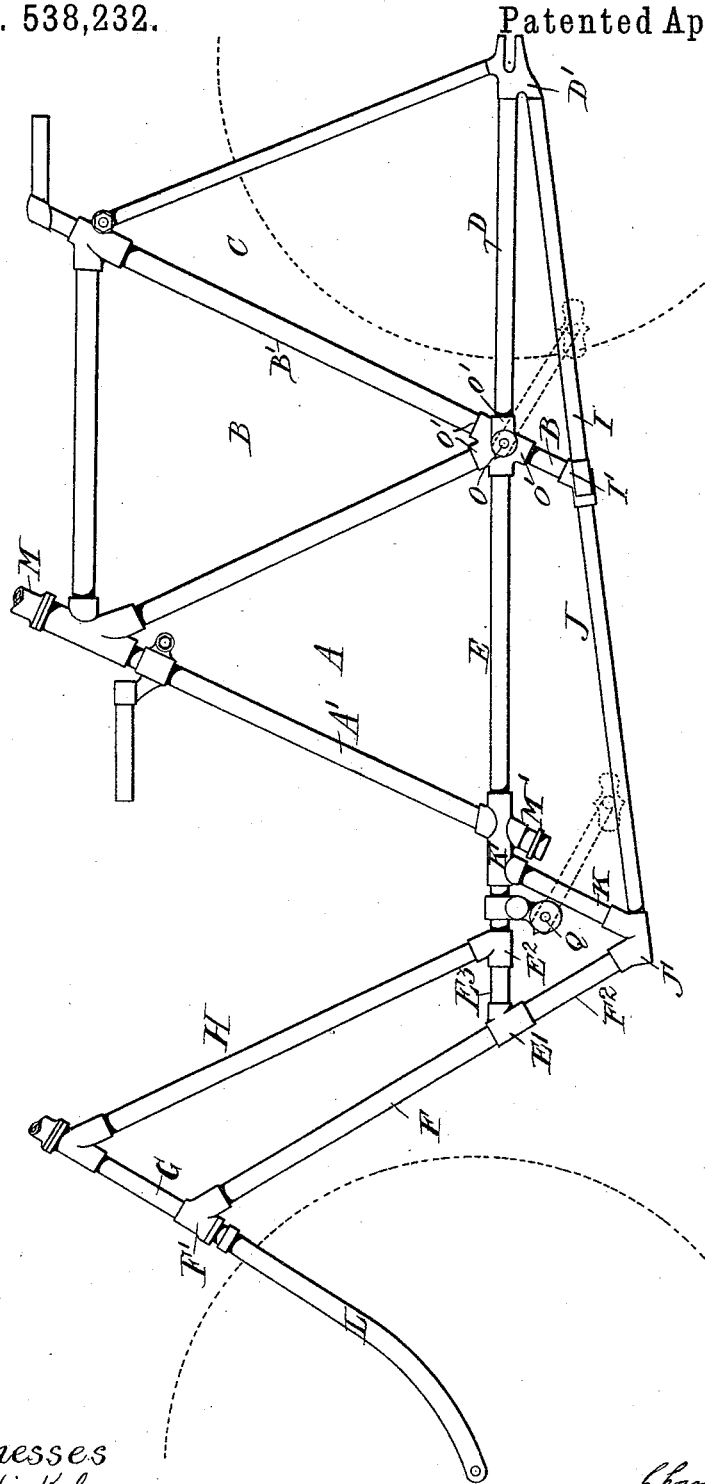
Figure 3:
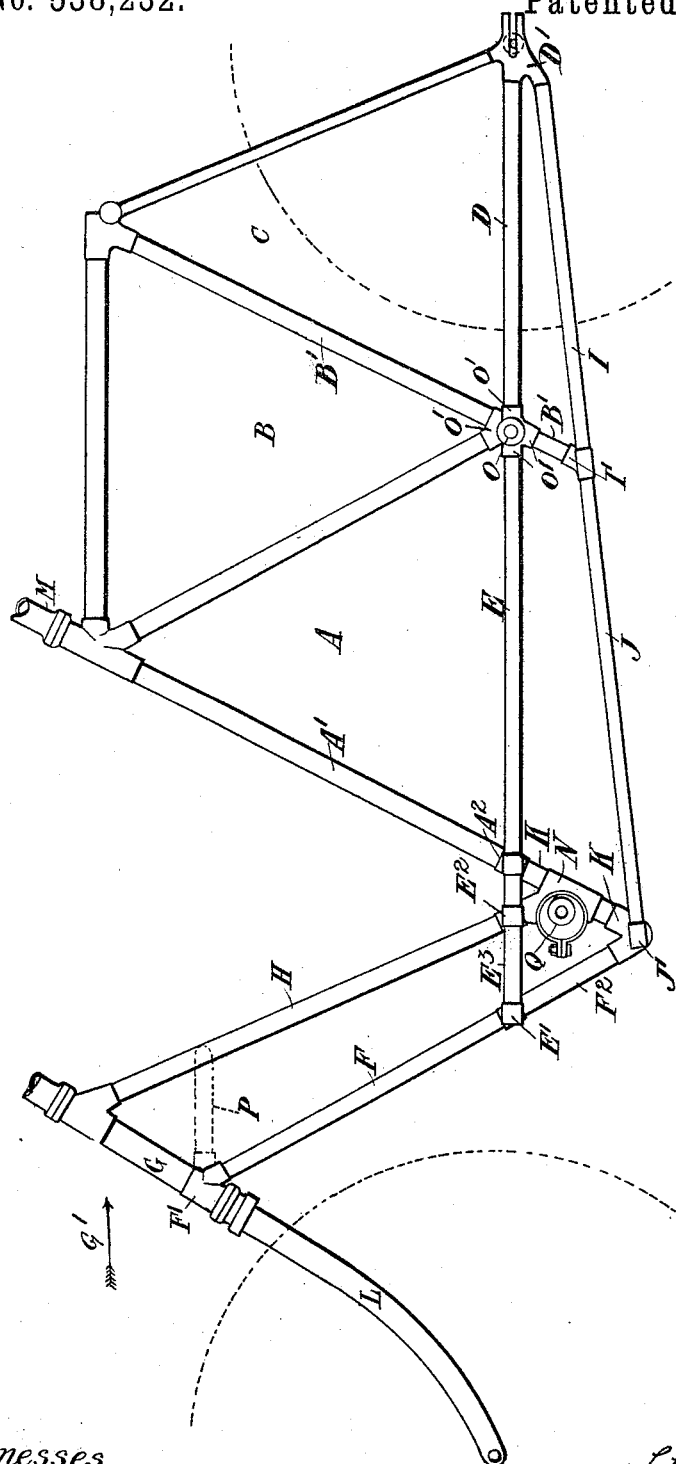
Figure 5:
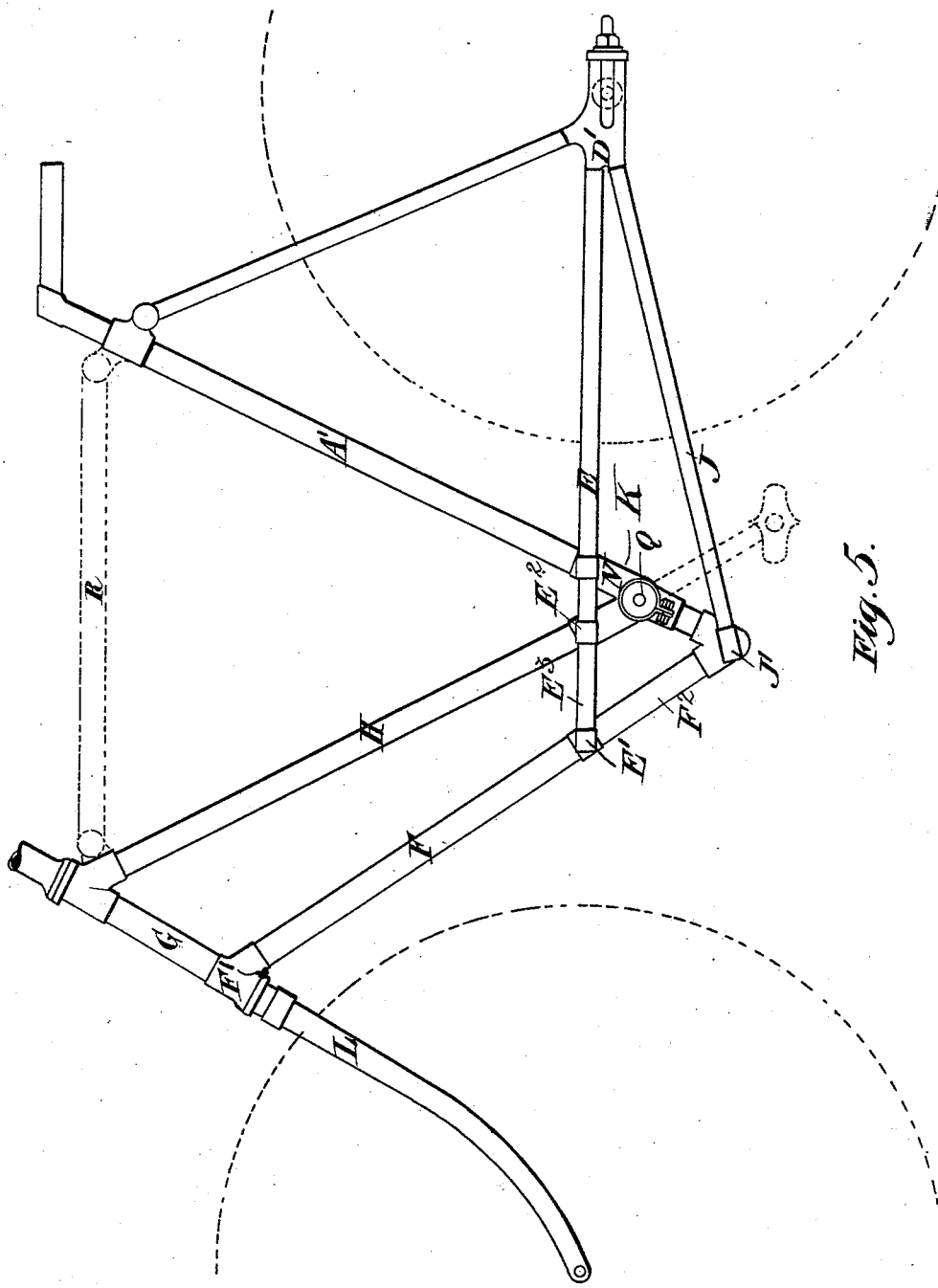
Figure 6:
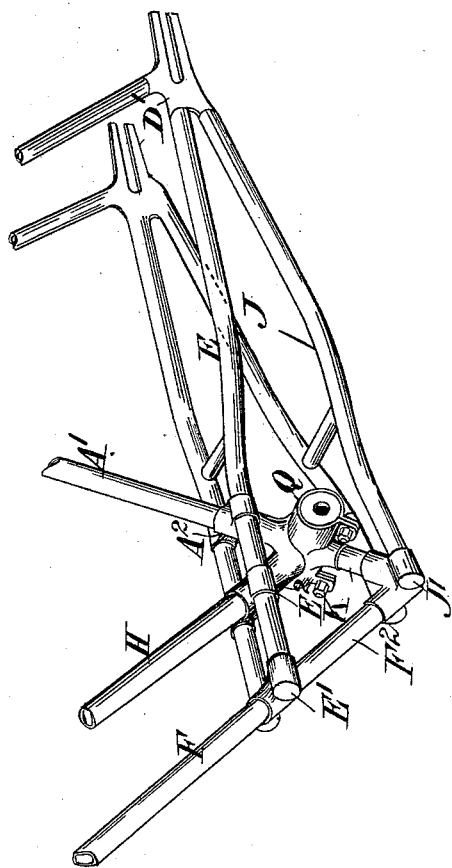

Figure 1 is a side elevation of a tandem bicycle constructed according to this invention; and Fig. 2 is a perspective view of a portion of the frame. Fig. 3 is a side elevation of a tandem bicycle in which a slight modification of the frame is introduced; and Fig. 4 is a perspective view of a portion of this frame. Fig. 5 is a side elevation of a single bicycle constructed according to this invention; and Fig. 6 is a perspective view of a portion of this frame.

Like letters represent like parts throughout the drawings.

Dealing first with Figs. 1 and 2 it will be seen that this tandem bicycle frame, so far as the upper portion is concerned, is very similar to forms now commonly in use, the present invention relating to the lower portion of the frame. The triangles A B and C are of substantially usual construction but the back fork D terminating as a fork at the crank axle bearing O of the back rider is carried forward as a single tube E $E^3$ right up to the front diagonal F which connects the bottom of the steering head G with this tube $E^3$ by means of the angle socket E'. In this and other cases where angle sockets or the like are described, I may use other forms of connections, say for example lap joints. The second diagonal H which extends from the top of the steering head G is also connected to this tube $E^3$ by the angle socket $E^2$. A second back fork I extends from the axle bearing of the back road wheel at D' to a little below the back crank axle O where by the angle socket I' it is connected with an extension of the back diagonal B'. This fork also is carried forward as a single tube J to the front of the machine where it joins an angle socket J' which also receives an extension $F^2$ of the front diagonal F and a short tube K which connects by the angle socket K' with the tube $E^3$. The tube K is intended as an extension of the diagonal A' but is shown detached from it here to allow of the steering rods which connect the steering fork L with the second rider's steering rod or tube M being connected at the bottom M'; this being an ordinary way of making that connection and not forming part of this invention is not further described here.

In Fig. 3 the tube K is shown as an extension of the diagonal A' and in this view it is actually a part of the same tube a different arrangement of the steering mechanism (not forming part of this invention and therefore not shown) being adopted to allow of this.

Where it is possible I prefer to make the tubes K and A' in a single piece. By this arrangement of the tubes exceptional rigidity of the frame is obtained particularly that part which is exposed to the shocks of the passage of the front wheel over obstacles. Taking for example the tubes H G F and $E^3$ it will be seen that when the front wheel strikes an obstacle the tendency of the head G is to yield back into the machine in the direction indicated by the arrow G'. To do this however the diagonal F which is intended to be made of fairly strong tube must either collapse (which it can hardly do since it is supported by the other tubes G H and $E^3$) or it must turn upon the point E' as a pivot thus moving in a forward direction its lower end and the socket J' in which it is fixed. This however it cannot do because of the tube J—which as explained already is a continuation of the fork I and is directly connected at the back end with the bracket D' which carries the back road wheel axle—which acts as a tie rod tying the socket J' to the bracket D' and thus prevents the tube F from giving, as it would do, if, as in the ordinary construction, it were stopped off at or about the point E' and carried only down to the bearing of the crank axle of the front rider. In the case of the reverse shock after the wheel has passed the obstacle the tube F cannot turn upon E' as a pivot in the opposite direction because it would then move the socket J' in an upward direction which is prevented by the tube K which conveys the blow to the fully stayed and supported portions of the frame-work and being short and stout is well able to withstand the compression strain thus put upon it. The tubes I and J therefore act chiefly to take the tension strains occasioned by the attempted movement of the tube F about the supposed pivot point E' while the short tube K takes the compression strains occasioned in the same manner. Again the head G cannot give way at its upper end turning about F' where it joins the tube F as a pivot point, because the tube H which is fully supported upon the tube $E^3$ prevents the upper end of the head from giving way. Thus the triangle formed by the tubes K $E^3$ and the lower part $F^2$ of the diagonal F greatly increases the rigidity of this portion of the frame while the lower fork or tie rods J I further assist in this result. The short tube B' serves to tie the forks D and I together at their forward ends and generally assist in promoting the rigidity of the whole frame-work.

In Figs. 1 and 2 the crank axle bearing Q of the front rider is shown pivoted to the tube $E^3$ while in Fig. 3 it is shown carried in an eccentric bracket. These arrangements however do not form part of the present invention, and I therefore do not confine myself to the use of any particular form of bearing.

Turning now to Figs. 3 and 4, it will be seen that substantially the same construction as that of Fig. 1 is adopted, the slight modifications employed being the following:—First, the tube K instead of being an independent tube as in Fig. 1 is merely an extension of the tube A'; second, the tube H instead of stopping at the tube $E^3$ as in Fig. 1 is carried down to the crank-axle bearing bracket N which is provided with the necessary branch to receive it, the tube A' K also passing through this bearing bracket; third, the fork D instead of terminating at the back crank axle and being continued as a single tube E is a fork or double tube throughout its whole length the two limbs of this fork passing one on each side of the tubes F H and A' with all of which they are connected by any suitable connections say for example the brackets E' $E^2$ and $A^2$, and with the back-axle bearing O in the line of the tube as in these figures the tubes D E must be divided at this point; but if the bearing be placed either higher or lower the tubes can be continuous throughout; fourth, the fork I instead of being continued as a single tube J as in Figs. 1 and 2 is, like the fork D, carried forward as a fork or double tube right up to the socket J' where it joins the tubes $F^2$ and K, the latter as already explained being a continuation of the tube A'. The fork I J is thus composed of two nearly straight tubes extending from the bracket D' which carries the axle of the back road wheel to the socket J'. This fork as in the former case is preferably tied to the upper fork D by the short tube B' which could be a portion of the diagonal B' unless the crank axle should pass through it at the point O indicated in the drawings. To allow of the tube being continuous the axle may be placed a little to one side so as not to interrupt this tube. The perspective view, Fig. 4, clearly shows how the tubes D E and I J are carried.

The ladies' safety bicycle shown in Figs. 5 and 6 is substantially the same as the front portion of the tandem bicycle shown in Fig. 3, but as this is a single machine the bracket D' is brought farther forward, the portion of framing and accommodation for the second rider being dispensed with. The front crank axle bearing Q placed in Fig. 3 so as to allow the tube A' to be continued down to the bracket J' without interruption may in this case be altered and placed in the axial line of the tube A' the reason for this being that while in the tandem it is necessary to make the front crank axle bearing adjustable so as to tighten the chain which runs from that axle to the back crank axle, in the single machine no such adjustment is necessary as the tightening of the chain can be effected by the ordinary back slot adjustment which may also be used for the back road wheel of the tandem.

It will be observed that one of the special unctions of the front portion $E^3$ of the tubef E as above explained is to prevent movement at the joints of the tubes H G F, and it will be noted that this might be effected by placing the tube $E^3$ in some other position or at some other level than that indicated. This would not be so satisfactory as there would then not be the continuity of the tubes between E' and D' which there is in the forms above described and furthermore moving this portion of the tube E higher up would place an additional strain upon the lower portions of the diagonals F and H. While therefore much preferring to put it as above described I have shown in dotted lines in Fig. 3 a short tube P which may be carried from the socket F' to the tube H and may be used instead of or in addition to the tube E at the lower end of those tubes; or it may be placed at any intermediate position.

I have hitherto described the stay I J as extending from the bottom of the triangle $F^2$ $E^3$ K at J' to the bracket D' which carries the axle of the back road wheel and this is the construction which I prefer for the tandem bicycle; nevertheless I may if desired connect it to the fork or tube D E at any point between the points J' and D', say for example at the crank axle bearing O of the second rider. This would produce very much the same result so far as the triangle F² E³ K is concerned but does not look so well and does not give quite the support to the back part of the frame which is obtained when the stay is carried back to D' and joined to the diagonal B'.

From the foregoing description and an examination of the drawings it will be seen that in both the tandem and the single machine a material portion of the framework is below the level of the crank axle bearings whereas in machines of this description hitherto made the frame practically and in most cases absolutely did not extend below the level of the crank axle bearings. The consequence was that when the pressure was applied by the feet of the riders acting upon the cranks these bearings being at the bottom of the framing the whole framing was liable to twist sidewise or "whip" as it is termed, first to one side and then to the other the result being to continually place the chain wheels carried by the crank axle or axles out of true alignment with the chain wheel carried upon the hub of the road wheel and consequently to increase the friction upon the chains or chain and generally to upset the stability of the whole frame, in addition to which there was the possibility that in a tandem machine where two crank axles were used the two axles might also get temporarily and sometimes permanently out of alignment with each other. All this is prevented by the arrangement which I have adopted where a material portion of the framework extends below the level of the crank axle bearings so as to prevent the side whip or straining, as well as the springing of the front fork.

Although not required for strength I may for the sake of appearance where the machine is to be ridden by a man, place a tube or stay R (shown in dotted lines in Fig. 5) so as to make the machine look like one of the ordinary diamond type. I prefer to make this detachable so that the machine may still be ridden by a lady. I am aware that such a detachable stay is already in use in some tandem bicycles with open fronts, it being, with such machines of ordinary construction, required to strengthen the machine when used by two male riders.

I claim—

1. In a cycle frame, the combination with the lower substantially horizontal member thereof supported at the rear on the axle, of a steering head, two diagonals connected thereto and to said horizontal member, the lower one of said diagonals extending beyond its connection with said member, and a brace connected to the lower end of said latter diagonal and to said horizontal member, substantially as described.

2. In a cycle frame the combination with the lower substantially horizontal member thereof supported at the rear on the axle, of a steering head, two diagonals connected thereto and to said horizontal member, the lower one of said diagonals extending below its connection with said member, an oppositely inclined brace connected to the lower end of said latter diagonal and to said horizontal member forming a triangle therewith, and a rearwardly extending stay at the lower part of said triangle, substantially as described.

3. In a cycle frame, the combination with the lower substantially horizontal member thereof, terminating at the rear in a fork, of a steering head, two diagonals extending downwardly therefrom and connected to the forward part of said horizontal member, the lower one of said diagonals extending beyond its connection with said member, an oppositely inclined brace connecting the lower end of the latter diagonal and said horizontal member, forming a triangle therewith, and a stay connecting the lower end of said triangle with the rear fork, substantially as described.

4. In a cycle frame, the combination with the lower substantially horizontal member thereof terminating at the rear in a fork, of a steering head, two substantially parallel diagonals F, H, extending downwardly therefrom and connected to the forward part of said horizontal member, the lower diagonal F being extended in a straight line beyond its connection with said member, an oppositely inclined diagonal A', a brace K in line therewith and connected to the lower end of the diagonal F, and a stay extending from the connection between said parts F and K to the rear fork, substantially as described.

5. In a cycle frame, the combination with the main member thereof connected to the rear axle and to the steering head, of a stay-portion substantially as described below said main member, and a crank axle bearing located above said stay-portion, whereby a material part of the frame is below said bearing and the usual side whip of the frame on the down thrust of the crank is prevented, as set forth.

6. In a cycle frame, the combination with the substantially horizontal member thereof supported at the rear on the axle, of the steering head, two diagonals connected thereto and to said horizontal member, the lower one of said diagonals extending below its connection with said member, an oppositely inclined brace connected to the lower end of said latter diagonal and to said horizontal member forming a triangle therewith, a stay extending from said triangle to the rear of the frame, and a crank shaft bearing located within and above the lower part of said triangle, substantially as described.

7. In a cycle frame, the combination of the steering head, two diagonals F, H, extending downwardly therefrom, an oppositely arranged diagonal A', a rear fork, and two stay tubes extending from said fork and passing upon opposite sides of said diagonals and connected thereto, substantially as described.

8. In a cycle frame, the combination of the steering head, two diagonals F, H, extending downwardly therefrom, an oppositely inclined diagonal A', a rear fork, two stay tubes extending from said fork and passing upon opposite sides of said diagonals and connected thereto, said diagonal F extending below said fork at $F^2$, an oppositely inclined brace K, and a stay extending from the junction of $F^2$ and K to the rear fork, substantially as described.

In testimony whereof I have hereto set my hand in the presence of the two subscribing witnesses.

CHARLES WILLIAM BROWN.

Witnesses:
ALFRED J. BOULT,
HARRY S. BRIDGES.